US012705120B2

(12) United States Patent
Hamann et al.

(10) Patent No.: US 12,705,120 B2
(45) Date of Patent: Aug. 11, 2026

(54) METHOD FOR PROVIDING A DISTRIBUTION MECHANISM

(71) Applicant: Robert Bosch GmbH, Stuttgart (DE)

(72) Inventors: Arne Hamann, Ludwigsburg (DE); Dakshina Narahari Dasari, Boeblingen (DE); Dirk Ziegenbein, Freiberg Am Neckar (DE); Michael Pressler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 18/194,481

(22) Filed: Mar. 31, 2023

(65) Prior Publication Data

US 2023/0367659 A1 Nov. 16, 2023

(30) Foreign Application Priority Data

May 13, 2022 (DE) .................... 10 2022 204 721.4

(51) Int. Cl.
*G06F 9/54* (2006.01)

(52) U.S. Cl.
CPC .................................. *G06F 9/546* (2013.01)

(58) Field of Classification Search
CPC .. G06F 9/546; G06F 9/5005; G06F 2209/503; H04L 67/60; H04L 67/2871; H04L 67/56; H04L 67/63
USPC ........................................................ 719/313
See application file for complete search history.

(56) References Cited

U.S. PATENT DOCUMENTS

| | | | | |
|---|---|---|---|---|
| 7,451,221 | B2 * | 11/2008 | Basani | H04L 67/1095 709/208 |
| 10,805,094 | B2 * | 10/2020 | Yoshihama | G06Q 20/401 |
| 10,855,753 | B2 * | 12/2020 | Kallakuri | H04L 69/24 |
| 2012/0284383 | A1 * | 11/2012 | Dudek | G06F 9/5027 709/223 |

* cited by examiner

*Primary Examiner* — Wei Y Mui
(74) *Attorney, Agent, or Firm* — Norton Rose Fulbright US LLP

(57) ABSTRACT

A method for providing a distribution mechanism for distributing at least one application in a system of distributed computing nodes. Each of at least one of the computing nodes of the system performs the following assessment steps: receiving an application requirement from a request service, wherein the application requirement specifies at least one requirement of the application concerning at least one resource of the computing node, analyzing the received application requirement in order to compare the at least one requirement of the application with an availability of the at least one resource at the computing node, so as to ascertain a suitability result regarding a suitability of the computing node for executing the application, transmitting the ascertained suitability result to a messaging service in order to provide the suitability result at said messaging service together with further suitability results regarding the suitability of further computing nodes of the system.

25 Claims, 1 Drawing Sheet

METHOD FOR PROVIDING A DISTRIBUTION MECHANISM

CROSS REFERENCE

The present application claims the benefit under 35 U.S.C. § 119 of German Patent Application No. DE 10 2022 204 721.4 filed on May 13, 2022, which is expressly incorporated herein by reference in its entirety.

FIELD

The present invention relates to a method for providing a distribution mechanism. In addition, the present invention relates to a computer program and to a device for that purpose.

BACKGROUND INFORMATION

It is described in the related art that clusters may comprise a plurality of heterogeneous distributed computing nodes, i.e., in particular computers having different capabilities. The computing nodes may communicate by way of messaging middleware, which, for example, offers a form of publish/subscribe semantics to allow incoming applications to be executed.

For an incoming application to be executed in the cluster, the application first has to be assigned to one of the computing nodes. The assignment, i.e., mapping, should be done such that the requirements of an application concerning the computing node are met and, advantageously, such that adequate account is taken of other objectives of the cluster, for example load equalization, at the same time. This may cause problems in particular in the case of a very heterogeneous cluster.

Conventional mapping solutions are executed, for example, by a centralized orchestrator. By way of example, the orchestrator has a centralized scheduler component that decides which computing node an application, such as an incoming service or a function, has to be provided on. In this respect, the metrics used for the decision regarding the target nodes are often static and are not based on the changing status of a computing node (e.g., the current processor and memory availability).

Solutions for assigning applications to different cores within a system-on-chip (SoC) are also conventional. However, these are immaterial for distributed systems. Since many properties of distributed systems are not taken into account, the approaches for SoC accordingly cannot be generalized for distributed systems.

SUMMARY

The present invention relates to a method, a computer program, and a device. Features and details of the present invention become apparent from the disclosure herein. In this respect, it goes without saying that features and details described in relation to the method according to the present invention also apply in relation to the computer program according to the present invention and the device according to the present invention, and vice versa, so at all times reference is or can be made reciprocally with respect to the disclosure of the individual aspects of the present invention.

The method is used in particular for providing a distribution mechanism for distributing at least one application in a system of distributed computing nodes. In particular, this means that a mechanism is provided that makes or prepares the decision regarding which computing node of the system an incoming application is to be executed on. In doing so, the distribution mechanism can take account of at least one criterion, such as one or more requirements of the application and/or resources of the computing nodes and/or a utilization of the computing nodes and/or an optimization of a load distribution of the system.

According to an example embodiment of the present invention, to provide the distribution mechanism at least in part, the computing nodes of the system, or at least one of the computing nodes of the system, can in each case perform the following assessment steps, the computing nodes each preferably carrying out the assessment steps successively in the stated order and/or in an automated manner:

- receiving an application requirement from a request service, in particular from at least one or more request servers, the application requirement specifying at least one requirement of the application, in particular of an incoming application in the system, concerning at least one resource of the computing node,
- analyzing the received application requirement in order to compare the at least one requirement of the application with an availability of the at least one resource at the computing node, so as to ascertain a suitability result regarding a suitability of the computing node for executing the application,
- transmitting the ascertained suitability result to a messaging service, in particular to a network and/or a middleware and/or via internet communication, in order to provide the suitability result at said messaging service together with further suitability results regarding the suitability of further computing nodes of the system, preferably in order to distribute the application for execution on one of the computing nodes on the basis of the suitability results, the application particularly preferably being executed on the computing node that has the highest suitability according to the suitability results.

An advantage of the method of the present invention is that a computing node itself can assess whether and to what extent it is suitable for executing the application. This decentralized configuration of the distribution mechanism allows for good scalability and high flexibility. In addition, dynamic distribution can be made possible as opposed to static solutions; in other words, criteria such as a current utilization of the computing nodes can be dynamically taken into account.

In addition, according to an example embodiment of the present invention, the following further distribution step may be provided:

- distributing the at least one application for execution on one of the computing nodes having the highest suitability on the basis of the suitability results.

Optionally, this step can be carried out in each case by the computing nodes, by the request service, or by a further central server in order to be able to carry out distribution according to the best suitability of the computing nodes.

According to an example embodiment of the present invention, the availability of the at least one resource at the computing node may include a dynamic availability, for example a utilization of the resources of the computing node, such as a processor and/or memory utilization. The dynamic availability may thus be dependent on a number of applications currently being executed by the computing node and/or a current load of the computing node due to said applications. Likewise, the dynamic availability may be dependent on the basic output capacity and/or communication capacity of the computing node, thus preferably on the type and size of the resources, as defined by the hardware and/or software equipment of the computing node. Alternatively or additionally, the availability may include a static availability, which refers to features of the computing node that do not change during the runtime of the applications, as opposed to dynamic availability. By way of example, this relates to functions of the computing nodes, for example the presence of certain hardware accelerators.

According to an example embodiment of the present invention, a computing group, also referred to as a computer cluster or simply a cluster, may comprise a plurality of networked computing nodes, i.e., in particular computers. The system according to the present invention may be configured as a distributed system, i.e., as a computing group comprising distributed computing nodes. Advantageously, it is provided that the computing nodes of the system are configured heterogeneously, i.e., that they differ in terms of output capacity and in particular in terms of the hardware and/or software used. Thus, the system can be configured in a scalable manner, whereby further computing nodes can be added regardless of the build of the computing nodes. The method according to the present invention then has the advantage that a suitable computing node can be particularly reliably ascertained, in particular in the case of heterogeneous clusters.

An 'application' can also be construed as a container and/or a virtual machine and/or an encapsulated function. In addition, the method is preferably not limited to one application per computing node, but rather a plurality of applications can be launched and executed by one computing node.

According to an example embodiment of the present invention, the application requirement may define a requirement that is preferably a desired or required condition for a computing node to host the application. The requirement concerning the resources may also be stated by an application manifest of the application requirement. The application requirement may be transmitted by an incoming application as a message to the messaging service and/or to the request service, in order to thus initiate the distribution by the distribution mechanism and thus the execution of the assessment steps.

The request service, in particular in the form of at least one request server, can serve as an access point and forwarding agent that sends the application requirement to the distributed cluster. Since the distribution by the computing nodes is preferably carried out in a self-organized manner, the function of the request service may be to forward the application requirement to the computing nodes to initiate the distribution and, possibly, to then monitor whether the application has been successfully launched. In addition, the request service can re-introduce (or reject) an application requirement if none of the computing nodes successfully launches the application within a pre-configured period of time. Where applicable, the request service may store or buffer application requirements until they are successfully hosted, or may instruct the messaging service to store a copy. Likewise, the request service may optionally be configured as a mediator if discrepancies occur between different computing nodes when the application is launched. In addition, a plurality of instances of the request service may be present in order to ensure either redundancy or high availability or to ensure suitability for scaling over large clusters. The request service may be configured as a central request server and thus be provided centrally in order to receive the application requirement from one or more applications and forward it to several of the computing nodes, for example via the messaging service.

According to an example embodiment of the present invention, the messaging service, also referred to as the messaging interconnect, may be provided for transferring messages between the computing nodes. For this purpose, the messaging service may also be configured as a network.

The suitability result, in particular in the form of a suitability metric, may reflect a suitability of a computing node for hosting, i.e., launching and executing, a particular application. An application may state its specific requirements concerning the resources of a computing node using the application requirement. Each computing node of the system can generate the suitability metric by way of the assessment steps such that the suitability metric states a degree of correlation with the requirements and the resources of said node. The suitability metric is thus specific to the application and/or specific to the computing node and/or specific to a current point in time since, for example, the resource availability of the computing node may change over time. The suitability metric may include a scalar value that is calculated as a weighted average of different terms, or a tuple that states whether or not the requirements are met. In addition, complex predicates for supplementing specific software requirements may also be stated in the suitability metric. The application-specific suitability metric may optionally be combined with a cluster-defined load metric in order to equalize the loads between different computing nodes. In other words, the utilization of the computing node and/or of the further computing nodes of the system can be taken into account when generating the suitability metric. For instance, computing nodes may also regularly publish their load status in the messaging service and agree on the rule that overloaded computing nodes do not compete for new applications. Where applicable, the suitability metric may also state more complex metrics that state the capability of the computing node to execute a function within a particular time. For this purpose, a detailed profile in terms of a computing, cache, and bandwidth profile, including a command mix of the computing node, may optionally be stated in the application manifest.

It may be provided according to an example embodiment of the present invention that the computing nodes each have a process handler, the assessment steps preferably being carried out by the process handlers concurrently at least in part when the application requirement is made available at the request service, in particular a request server, by the application. 'Concurrently' can be construed to mean that a plurality of computing nodes carry out the assessment steps at the same time at least in part. In this way, the process handlers, as distributed process handlers of the system, can provide the suitability results at the messaging service. The process handler may also be referred to below for short as the DPH (distributed process handler).

In addition, in the context of the present invention, it may be advantageous for the suitability results to each include a statement, and in particular a metric, for assessing a suitability of the computing node in question for hosting the application. In this respect, the transmission of the ascertained suitability results by the process handlers may lead to at least one, or precisely one, automated competition being initiated, in which the suitability results, as bids for hosting the application, are compared with one another. The computing node having the highest suitability for hosting can thus be ascertained in order, for the purpose of the distribution, to allocate the application to said computing node having the highest suitability for the execution. If, during the assessment steps, the analysis shows that the computing node can meet the stated requirements, in particular stated in an application manifest, it is advantageously provided that the DPH calculates the suitability result in the form of a suitability metric. Next, the bid for hosting the application on the computing node having said DPH (i.e., the bidder) is issued in that the DPH publishes the suitability metric in the system via the messaging service. For this purpose, the suitability metric may, for example, be disseminated on the messaging service via a broadcast or multicast. The bidder having the highest suitability metric may then win that 'bidding round,' meaning that the application is provided on that bidder. The competition may also be thought of as an auction, meaning that the distribution mechanism is accordingly auction-based.

In addition, according to an example embodiment of the present invention, it may be provided that the system is divided into at least two, at least three, at least five, or more partitions, the automated competition initially being carried out in each case for just one of the partitions or each of the partitions in order to ascertain which of the computing nodes in the one partition or each partition has the highest intra-partition suitability for hosting. Preferably, from this ascertainment, i.e., from the ascertained computing nodes of the highest intra-partition suitability, it is possible to ascertain which of the computing nodes has the highest inter-partition suitability for hosting, preferably by a further competition. By way of example, the partitions may carry out the competition at the same time at least in part, such that a competition can then take place between the winners in each of the partitions. It is also possible to use a round robin among partitions. Application requirements can then be presented to the partitions in a round robin process. If, in the process, in accordance with a first case, a suitable computing node is found, the application can be executed thereon. If, in accordance with a second case, no suitable computing node can be found, the competition can be initiated in one of the other partitions. Furthermore, a new application may always be sent to a new partition in the round robin plan. Another possibility is that each partition has a particular computing node, the partition leader, which knows the capabilities of the various computing nodes in its partition and their current status, namely, for example, the availability of each resource. The competition can then initially be carried out only between the partition leaders. As soon as one partition leader wins, it can initiate a second competition between the computing nodes in its partition. The advantage of this is particularly efficient and scalable distribution in a relatively large cluster.

According to a further advantage of the present invention, it may also be provided that the computing nodes each have a process handler that ascertains the availability of the at least one resource of the computing node in question in that the process handler monitors the at least one resource of the computing node in question. In addition, the availability may be repeatedly ascertained in order for any change in availability to be taken into account and/or detected in the monitoring and in order to be able to dynamically adjust the suitability result on the basis of said change. Thus, the status of a computing node, which changes on the basis of, for example, the utilization due to the execution of further applications, can be dynamically taken into account when distributing applications. Accordingly, the monitoring can be carried out during a runtime of the applications of the computing node. In this case, the current availability of resources, such as processor and memory power, are determined by, for example, the current utilization of the computing node, so it is subject to constant change.

A further advantage in the context of the present invention can be achieved if, before the assessment steps are carried out by the at least one computing node, and in particular by the computing nodes, the following request step is carried out:

- transmitting, by the application, the application requirement to the request service, in particular at least one or precisely one central request server, in order for the execution to be initially requested by the application, it being possible for the application requirement to have an application manifest that specifies the requirements of the application concerning the execution by a computing node, the application manifest then preferably being processed by the at least one computing node, or by the computing nodes, in the assessment step of analyzing the application requirement in order in each case to provide the suitability result regarding the suitability of the corresponding computing node for the execution.

The advantage of this is that the distribution mechanism can be initiated in a simple manner by the applications themselves and be influenced by the definition of the application manifest. In this case, the application manifest may be statically defined for the application or be dynamically adjusted to current developments.

Advantageously, in the context of the present invention, it may be provided that the computing nodes of the system are configured as heterogeneous computing nodes which differ in terms of an output capacity, in particular in terms of the dimensioning of at least one processor and/or memory and/or communication bandwidth and/or architecture and/or at least one software function, for executing the application. Furthermore, the system, as a scalable system, may be configured to be expanded with further computing nodes. The advantage here is that the distribution mechanism can be used immediately after expansion owing to its decentralized configuration. The computing nodes of the system may also be heterogeneous in that they include computers comprising different architectures (ARM, Intel, etc.) and different capabilities (CPUs, GPUs, customer-specific accelerators). The solution according to the present invention may have the advantage whereby the distribution is not limited to a series of homogeneous racks in a computing center-like architecture. It is additionally possible for the computing nodes to be geographically scattered. Optionally, by way of the application requirement, an application can also establish enhanced requirements in terms of timeframe (e.g., termination within X units of time or stipulated round-trip response times) and/or the need for particular hardware functions and/or the affinity to a sub-group of computing nodes, etc.

According to a further option according to the present invention, it may be provided that the at least one resource of the computing node comprises at least one of the following resources, the application requirement specifying the requirement concerning said resource, in particular in order for parameters of the distributed system to be taken into account in the distribution:

- an output capacity, in particular a processor and/or memory capacity, preferably a memory bandwidth, of the computing node,
- an acceleration mechanism of the computing node, in particular a GPU acceleration and/or a hardware acceleration,
- software of the computing node, a quality of a network connection to the computing node,
a synchronization status of a clock generator of the computing node.

Thus, in particular in the case of different heterogeneous nodes, various criteria are taken into account, such as a different quality of the network conditions between the nodes, potentially unsynchronized clock generators, applications having specific requirements in terms of timing, reliability and node capabilities, and other features.

According to an advantageous development of the present invention, it may be provided that the system is in the form of an edge computing system or a cloud computing system. Preferably, the application can be configured as an at least partially autonomous driving function for a vehicle. In addition, the method may, alternatively or additionally, be used in a distributed middleware and/or in an operating system and/or in a hypervisor and/or in an Internet of Things application and/or in a vehicle controller.

It is also possible for the messaging service to provide communication among the computing nodes and to be preferably configured as a communication network in which the suitability results are transmitted as a broadcast or multicast. A broadcast in a computer network is a message that is transmitted to all the subscribers to a network and in particular does not require a response. Similarly, multicast refers to the transmission of a message from one point to a group but not necessarily to all the subscribers.

In addition, in the context of the present invention it may be provided that the following distribution step, carried out after the ascertained suitability result has been transmitted, is carried out, in particular in each case by the computing nodes, by the request service, or by a further central server:

making a decision regarding the execution of the application on the computing node on the basis of a comparison of the suitability result with the further suitability results such that, preferably, the application is distributed for execution on one of the computing nodes on the basis of the suitability results and/or is executed on the computing node having the highest suitability.

Thus, the decision can be made by each computing node itself and in a decentralized or, alternatively, centralized manner. The advantage of this is that an optimal solution is available depending on the structure and size and the requirements concerning scalability.

According to a first option of the present invention, the method according to the present invention may provide the distribution mechanism as a decentralized and/or distributed mechanism and/or in the form of a 'dispatcher' for distributing applications to a computing node within the system. The distribution mechanism may be provided at least by the assessment steps and in particular by the decision regarding the execution of the application on the computing node being made on the basis of the comparison of the suitability result with the further suitability results. In this case, the distribution mechanism can be provided in a decentralized manner, i.e., by a plurality or all of the computing nodes of the system. For instance, each of the computing nodes may have the process handler that, where applicable, interacts with the messaging service in order to perform the assessment steps and/or the aforementioned making of the decision regarding the execution. The computing node to which an application is allocated as part of the distribution and on which the application is executed or is intended to be executed can also be referred to as the target node. In the case of the decentralized distribution mechanism, each computing node can itself compare the suitability results and thus establish which one is the target node. It may be possible for the applications to be encapsulated in containers so that they can be executed on the target node. It is also possible for the target node to have suitable software (for example an operating system and/or relevant libraries) for executing the application. The application may be precompiled for the platform or use a hardware-independent language, such as WebAssembly, which provides the target node as a suitable runtime environment for the application. Alternatively, these requirements could also be stated in the application manifest. In particular, the target node then has to meet said requirements in order to host the application.

The present invention likewise relates to a computer program, preferably a computer program product, in particular a process handler, comprising commands which, when the computer program is executed by a computer, in particular a computing node, cause said computer to carry out the method according to the present invention. Therefore, the computer program according to the present invention brings the same advantages as described in detail with reference to a method according to the present invention.

The present invention likewise relates to a data processing device, in particular a computing node of a system, configured to carry out the method according to the present invention. Therefore, the device according to the present invention brings the same advantages as described in detail with reference to a method according to the present invention.

By way of example, according to an example embodiment of the present invention, a data processing device and/or a computing node that executes the computer program may be provided as the device or computer. The computer may have at least one processor for executing the computer program. A non-volatile data memory may also be provided, in which the computer program is stored and from which the computer program can be read out by the processor for the execution.

The present invention likewise relates to a computer-readable storage medium that comprises the computer program according to the present invention. By way of example, the storage medium is in the form of a data memory such as a hard disk and/or a non-volatile memory and/or a memory card. The storage medium may be integrated in the computer, for example.

In addition, the method according to the present invention may be embodied as a computer-implemented method.

Further advantages, features, and details of the present invention become apparent from the following description, in which exemplary embodiments of the present invention are described in detail with reference to the figures. In this respect, the features disclosed herein may each be essential to the present invention individually per se or in any combination.

DETAILED DESCRIPTION OF EXAMPLE EMBODIMENTS

Figure 1:
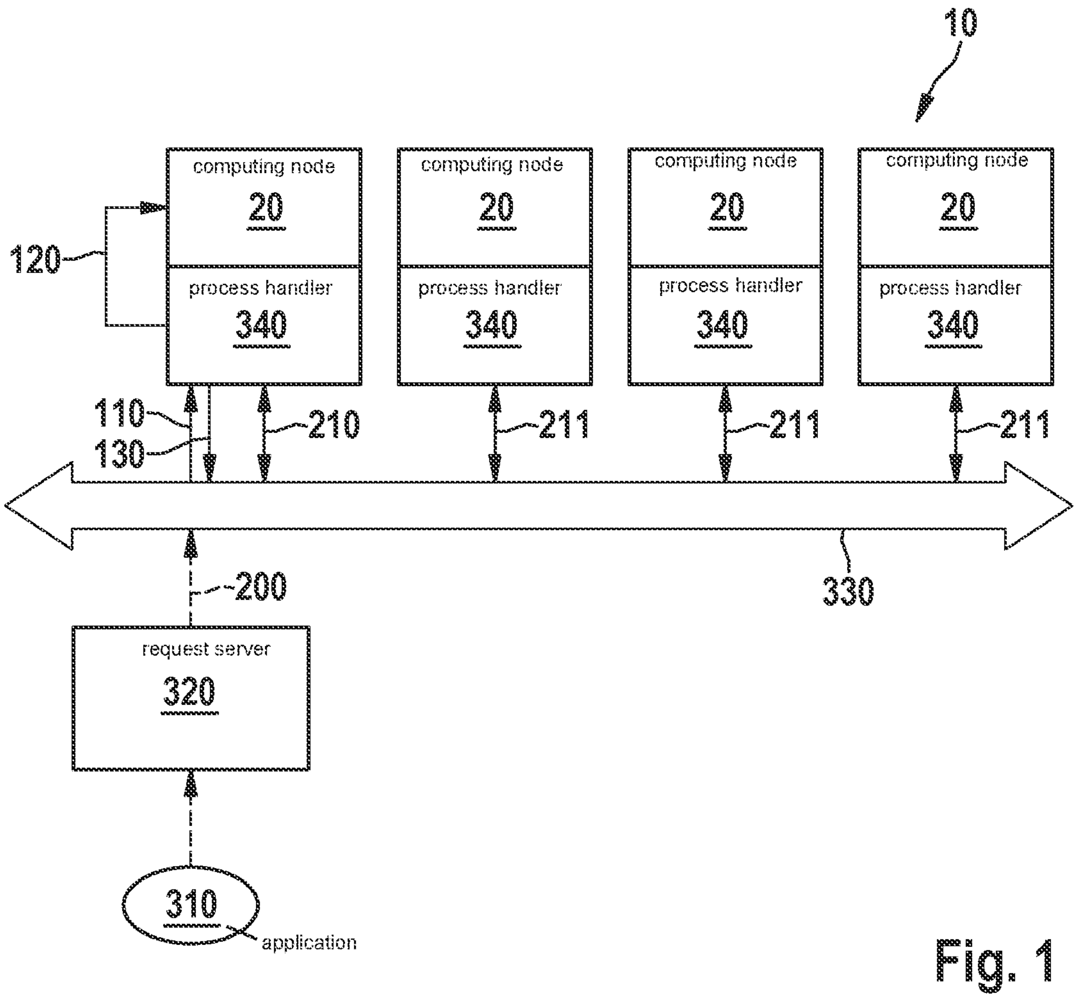
FIG. 1 schematically shows a method according to the present invention.

In the subsequent figures, the same reference numerals are used for the same technical features even of different exemplary embodiments.

20 FIG. 1 schematically shows a method for providing a distribution mechanism for distributing at least one application 310 in a system 10 of distributed computing nodes 20, the computing nodes 20 or at least one of the computing nodes 20 of the system 10 in each case being able to carry out a plurality of assessment steps. In this case, according to a first assessment step 110, receipt of an application requirement 200 from a request service 320 can be provided, the application requirement 200 specifying at least one requirement of the application 310 concerning at least one resource of the computing node 20. Next, according to a second assessment step 120, the received application requirement 200 can be analyzed in order to compare the at least one requirement of the application 310 with an availability of the at least one resource at the computing node 20. In this way, a suitability result 210 regarding a suitability of the computing node 20 for executing the application 310 can be ascertained. Next, according to a third assessment step 130, the ascertained suitability result 210 can be transmitted to a messaging service 330 in order to provide the suitability result 210 at said messaging service together with further suitability results 211 regarding the suitability of further computing nodes 20 of the system 10, so as to distribute the application 310 for execution on one of the computing nodes 20 on the basis of the suitability results 210, 211.

FIG. 1 also shows that the computing nodes 20 each have a process handler 340, the assessment steps being carried out by the process handlers 340 concurrently at least in part when the application requirement 200 is made available at the request service 320, in particular a request server 320, by the application 310. As shown, therefore, the process handlers 340, as distributed process handlers 340 of the system 10, can provide the suitability results 210, 211 at the messaging service 330.

Figure 2:
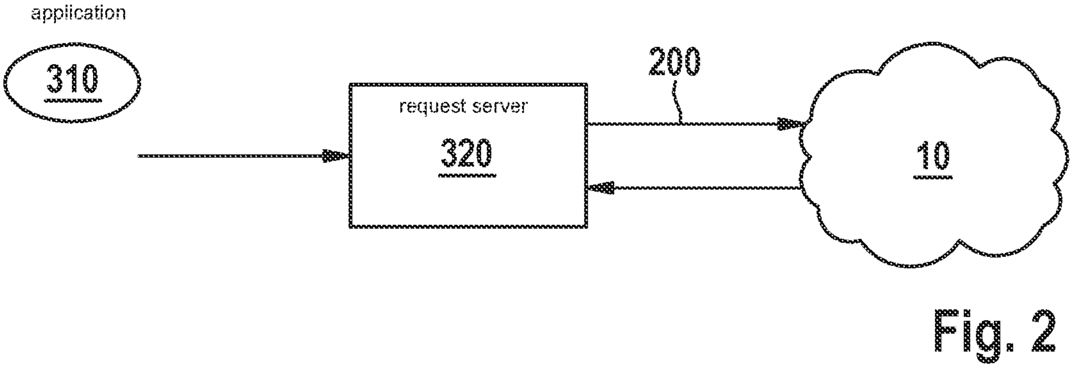
FIG. 2 schematically shows a further example of a method according to the present invention.

FIG. 2 shows an example sequence of a method according to the present invention that begins first with the application requirement 200 being forwarded to the distributed system 10 and thus to the computing nodes 20. For this purpose, a topic 'ApplicationHostRequest' containing an application manifest can, for example, be published using middleware. The topic can be published using the messaging service 330 shown in FIG. 1. The process handler 340, likewise shown in FIG. 1, on each computing node 20 in the distributed system 10 can then subscribe to the topic 'ApplicationHostRequest' and thus analyze said message and therefore read the application manifest. To analyze the received application requirement 200, the particular computing node 20 on which the process handler 340 is located can then check whether all the requirements stated in the application manifest are met. If the requirements are met, an assessment criterion can be looked up and the specific suitability assessment can be calculated. Optionally, an assessment of 0 can also be sent if the requirements are not met; this would ensure a response to the request service 320 if no computing node 20 meets the requirements.

The suitability results 210, 211 may each comprise a suitability assessment calculated in this way, in particular in the form of a suitability metric for assessing the suitability of the particular computing node 20 for hosting the application 310. The transmission of the ascertained suitability results 210, 211 by the process handlers 340 may lead to at least one automated competition being initiated. In this competition, the suitability results 210, 211, as bids for hosting the application 310, are compared with one another to ascertain which of the computing nodes 20 has the highest suitability for hosting. For the purpose of the distribution, the application 310 can then be allocated to said computing node 20 having the highest suitability for the execution. To do so, the process handler 340 can, for example, subscribe to the topic 'ApplicationHostResponse' sent by other computing nodes 20. The process handler 340 can thus also observe other response messages on this topic. If the calculated suitability metric of the current computing node 20 is the same as or higher than the one received from other computing nodes 20, the process handler 340 can publish an 'ApplicationHostResponse' message in which it states its suitability.

In addition, a consensus protocol can be provided. The consensus protocol can converge by making the decision regarding the winner (the computing node 20 that ultimately hosts the application 310), for example according to the variants described below.

According to a first variant, after a pre-specified time following the start of the competition, all the computing nodes 20 can analyze the scores of the other computing nodes 20 in the system 10 so that there is only one winner having the highest score. The process handler 340 on that computing node 20 can then ask the request service 320 to send the application 310 that is to be hosted, or it retrieves the application directly from a location stated in the application manifest. In the event of a tie, the computing nodes 20 may revert to a predetermined mechanism in order to break and end the tie. This mechanism could, for example, include the computing node 20 having the higher MAC address. Other mechanisms could be resolved depending on geographical proximity, etc.

In addition, the request service 320 and/or a further service or server can be used as the decision maker by the decision maker observing all the messages and/or suitability results 210, 211 circulating in the messaging service 330, for example in a network of the system 10, and deciding on that basis which computing node 20 is to host the application 310.

In the system 10 in the form of a distributed cluster, a plurality of application requirements 200 can potentially be specified at the same time, leading to 'race conditions.' These race conditions can be resolved using approaches based on logical clocks, or pragmatically using a strategy in which each computing node 20 responds to just one application requirement 200 at the same time. The last-mentioned solutions may bring the advantage of a scalable solution requiring relatively little implementation effort. Alternatively or additionally, for this purpose each application requirement 200 of an application 310 can receive a time stamp. If there are a plurality of such requests in the system 10 at the same time, the application requirements 200 may be processed in a virtual distributed request queue in the order of the time stamps.

Each competition phase can optionally also have a timeout mechanism and a maximum repetition mechanism. If no computing node 20 expresses its interest, the application requirement 200 can be sent out again after a particular interval of the request service 320.

If the system 10 is in the form of a very large cluster, it might be less efficient to reach a consensus on such a large scale. By way of example, it is then possible for the decisions to be made on a plurality of levels. For example, a hierarchical, tree-based solution can be used in which the cluster is split into smaller partitions. All the smaller partitions can carry out the competition at the same time, such that a competition can then take place between the winners in each of the partitions. It is also possible to use a round robin among partitions. Application requirements 200 can then be presented to the partitions in a round robin process.

If, in accordance with a first case, a suitable computing node 20 is then found, the application 310 can be provided. If, in accordance with a second case, no suitable computing node 20 can be found, the competition can be initiated in another partition. In addition, a new application 310 can always be sent to a new partition in the round robin plan.

Another possibility is to split the network of the system 10 into sub-partitions. Each partition can then have a particular computing node 20, the partition leader, which knows the capabilities of the various computing nodes 20 in its sub-network and their current status. All the partition leaders can then compete for an application 310. As soon as one partition leader wins, it can initiate a second competition between the computing nodes 20 in its partitions.

It may also be possible that a computing node 20 fails after having won a competition. To ensure that an application requirement 200 is not lost, other computing nodes 20 could potentially continually send heartbeat messages to the request service 320 so that a failed computing node 20 can be ascertained. If a computing node 20 that recently broke down has been selected for hosting an application 310, the request service 320 can restart the competition by resending the application manifest.

The aforementioned explanation of the specific embodiments describes the present invention solely within the framework of examples. It goes without saying that, where technically feasible, individual features of the specific embodiments can be freely combined with one another without departing from the scope of the present invention.

What is claimed is:

1. A computer-implemented method for distributing and executing an application in a system of distributed computing nodes, the method comprising:

receiving, by each of a plurality of the computing nodes of the system, an application requirement from a request service, wherein the application requirement specifies at least one requirement of the application concerning at least one resource;

carrying out an automated competition for execution of the application, the automated competition comprising each respective one of the computing nodes that participates in the automated competition performing the following:

analyzing the received application requirement by comparing the at least one requirement of the application with an availability of the at least one resource at that computing node, wherein the availability reflects runtime usage of hardware resources of the computing node that dynamically changes during operation of the system due to execution of one or more applications, so as to ascertain a suitability result regarding a suitability of the respective computing node for executing the application; and transmitting the ascertained suitability result to a messaging service so that the suitability result is made available together with further suitability results of other computing nodes participating in the automated competition;

distributing the application to a computing node selected on the basis of a comparison of the suitability results; and executing the application on the selected computing node;

wherein the system comprises a plurality of partitions, each partition including a subset of the computing nodes, and wherein the automated competition is partition-scoped such that suitability results are compared within partitions rather than across all computing nodes of the system as a single candidate set.

2. The method as recited in claim 1, wherein the selected computing node is selected in a selecting step based on having a highest one of the suitability results.

3. The method as recited in claim 1, wherein the computing nodes each has a process handler, the assessment steps being carried out by the process handlers concurrently at least in part when the application requirement is made available at the request service at a request server, by the application such that the process handlers, as distributed process handlers of the system, provide the suitability results at the messaging service.

4. The method as recited in claim 3, wherein the suitability results each include a statement or a metric for assessing a suitability of each computing node for hosting the application, the transmission of the ascertained suitability results by the process handlers leading to at least one automated competition being initiated, in which the suitability results, as bids for hosting the application, are compared with one another to ascertain which of the computing nodes has the highest suitability for hosting in order, for the purpose of the distribution, to allocate the application to the computing node having the highest suitability for the execution.

5. The method as recited in claim 1, wherein each computing node of the computing nodes has a process handler that ascertains the availability of the at least one resource of the computing node in that the process handler monitors the at least one resource of the computing node, the availability being ascertained repeatedly for any change in availability to be taken into account in the monitoring and to dynamically adjust the suitability result based on the change.

6. The method as recited in claim 1, wherein before the assessment steps are carried out by the at least one computing node, the following request step is carried out:

transmitting, by the application, the application requirement to the request service, for the execution to be initially requested by the application, the application requirement having an application manifest that specifies the requirements of the application concerning the execution by a computing node, the application manifest then being processed by the at least one computing node, in the assessment step of analyzing the application requirement to provide the suitability result regarding the suitability of the computing node for the execution.

7. The method as recited in claim 1, wherein the computing nodes of the system are configured as heterogeneous computing nodes which differ in terms of an output capacity, including in terms of: dimensioning of at least one processor and/or memory and/or communication bandwidth and/or architecture and/or at least one software function, for executing the application, the system, as a scalable system, being configured to be expanded with further computing nodes.

8. The method as recited in claim 1, wherein at the at least one resource of the computing node includes at least one of the following resources, the application requirement specifying the requirement concerning the resource:

an output capacity, including a processor of the computing node and/or memory capacity including a memory bandwidth of the computing node, an acceleration mechanism of the computing node, including a GPU acceleration, software of the computing node, a quality of a network connection to the computing node, a synchronization status of a clock generator of the computing node.

9. The method as recited in claim 1, wherein the system is an edge computing system or a cloud computing system, the application being configured as an at least partially autonomous driving function for a vehicle.

10. The method as recited in claim 1, wherein the messaging service provides communication among the computing nodes and is configured as a communication network in which the suitability results are transmitted as a broadcast or multicast.

11. The method as recited in claim 1, wherein the distribution includes performance of the comparison by each computing node of the computing nodes, by the request service, or by a further central server.

12. The method according to claim 1, wherein the automated competition comprises carrying out, in parallel, a respective automated competition within each of the plurality of partitions to identify, for each partition, a computing node having a highest suitability result within that partition, and wherein distributing the application comprises selecting the computing node for execution based on a comparison of the suitability results of the computing nodes identified for the respective partitions.

13. The method according to claim 1, wherein the automated competition is initiated for a first partition of the plurality of partitions, and wherein, if no computing node in the first partition is determined to be suitable for executing the application, the automated competition is subsequently initiated for at least one other partition according to a predetermined ordering of the partitions.

14. The method according to claim 1, wherein each partition includes a partition leader computing node, wherein the automated competition initially comprises a competition among the partition leader computing nodes to identify a selected partition, and wherein the automated competition further comprises, subsequent to and based on the identification of the selected partition, carrying out a competition among computing nodes within the selected partition to distribute and execute the application.

15. The method according to claim 1, wherein the automated competition comprises allowing a pre-specified time interval to elapse during which suitability results are made available via the messaging service, and wherein, after expiration of the pre-specified time interval, each computing node determines a winning computing node based on the suitability results, and wherein, in the event that two or more computing nodes have equal suitability results, the winning computing node is determined using a predetermined deterministic tie-break rule based on a node identifier.

16. The method according to claim 1, wherein each computing node participating in the automated competition:

first determines whether the at least one requirement of the application is satisfied by the availability of the at least one resource of that computing node; and is configured to:

in response to determining that the at least one requirement is satisfied, calculate and transmit a suitability result representing a degree of suitability for executing the application; and in response to determining that the at least one requirement is not satisfied, transmit a suitability result indicating non-feasibility, the suitability result indicating non-feasibility comprising a predefined value.

17. The method according to claim 16, wherein the predefined value is zero.

18. The method according to claim 1, wherein:

a plurality of application requirements are receivable concurrently by the system;

each application requirement is associated with a timestamp; and application requirements are processed according to an ordering based on the timestamps so as to resolve race conditions among concurrently received application requirements.

19. The method according to claim 18, wherein the timestamps are generated using a logical clock.

20. The method according to claim 18, wherein the application requirements are processed using a virtual distributed request queue ordered according to the timestamps.

21. The method according to claim 1, wherein the automated competition for execution of the application is subject to a timeout period, and wherein, in response to expiration of the timeout period without a computing node being selected to execute the application, the application requirement is reissued to the system for a subsequent automated competition.

22. The method according to claim 21, wherein the reissuance of the application requirement is limited to a maximum number of repetitions.

23. The method according to claim 1, wherein, after distributing the application to the selected computing node, the system monitors availability of the selected computing node using heartbeat messages, and wherein, in response to detecting a failure of the selected computing node prior to or during execution of the application, the automated competition is restarted by reissuing the application requirement.

24. Non-transitory computer-readable media on which are stored computer program instructions including commands distributing and executing an application in a system of distributed computing nodes, the commands, when executed using the computing nodes of the system, causing performance of the following steps:

receiving, by each of a plurality of the computing nodes of the system, an application requirement from a request service, wherein the application requirement specifies at least one requirement of the application concerning at least one resource;

carrying out an automated competition for execution of the application, the automated competition comprising each respective one of the computing nodes that participates in the automated competition performing the following:

analyzing the received application requirement by comparing the at least one requirement of the application with an availability of the at least one resource at that computing node, wherein the availability reflects runtime usage of hardware resources of the computing node that dynamically changes during operation of the system due to execution of one or more applications, so as to ascertain a suitability result regarding a suitability of the respective computing node for executing the application; and transmitting the ascertained suitability result to a messaging service so that the suitability result is made available together with further suitability results of other computing nodes participating in the automated competition;

distributing the application to a computing node selected on the basis of a comparison of the suitability results; and executing the application on the selected computing node;

wherein the system comprises a plurality of partitions, each partition including a subset of the computing nodes, and wherein the automated competition is partition-scoped such that suitability results are compared within partitions rather than across all computing nodes of the system as a single candidate set.

25. A system of distributed computing nodes that each includes a data processing system that includes at least one processor, the system being configured, for distributing and executing an application in the system of distributed computing nodes, to:

receive, by each of a plurality of the computing nodes of the system, an application requirement from a request service, wherein the application requirement specifies at least one requirement of the application concerning at least one resource;

carry out an automated competition for execution of the application, the automated competition comprising each respective one of the computing nodes that participates in the automated competition performing the following:

analyzing the received application requirement by comparing the at least one requirement of the application with an availability of the at least one resource at that computing node, wherein the availability reflects runtime usage of hardware resources of the computing node that dynamically changes during operation of the system due to execution of one or more applications, so as to ascertain a suitability result regarding a suitability of the respective computing node for executing the application; and transmitting the ascertained suitability result to a messaging service so that the suitability result is made available together with further suitability results of other computing nodes participating in the automated competition;

distributing the application to a computing node selected on the basis of a comparison of the suitability results; and executing the application on the selected computing node;

wherein the system comprises a plurality of partitions, each partition including a subset of the computing nodes, and wherein the automated competition is partition-scoped such that suitability results are compared within partitions rather than across all computing nodes of the system as a single candidate set.

* * * * *